US006896810B2

(12) United States Patent
Ali et al.

(10) Patent No.: US 6,896,810 B2
(45) Date of Patent: May 24, 2005

(54) PROCESS FOR PRODUCING ALKALINE TREATED CELLULOSIC FIBERS

(75) Inventors: Omar F. Ali, Richmond Hill, GA (US); John T. Cenicola, St. Simons Island, GA (US); Jian Li, Richmond Hill, GA (US); Jay D. Taylor, Pooler, GA (US)

(73) Assignee: Rayonier Products and Financial Services Company, Fernandina Beach, FL (US)

( * ) Notice: Subject to any disclaimer, the term of this patent is extended or adjusted under 35 U.S.C. 154(b) by 176 days.

(21) Appl. No.: 10/211,043

(22) Filed: Aug. 2, 2002

(65) Prior Publication Data

US 2004/0020854 A1 Feb. 5, 2004

(51) Int. Cl.$^7$ .............................................. B01D 61/00
(52) U.S. Cl. .................... 210/652; 210/651; 210/195.2; 162/1; 162/29; 162/60; 162/14; 8/125; 536/56
(58) Field of Search ................................ 210/652, 651, 210/195.2; 8/125; 536/56, 60; 162/1, 14, 29, 60

(56) References Cited

U.S. PATENT DOCUMENTS

| | | | |
|---|---|---|---|
| 2,247,143 A | | 6/1941 | Bailey |
| 3,556,992 A | | 1/1971 | Massucco |
| 3,635,670 A | | 1/1972 | Kennedy |
| 4,270,914 A | * | 6/1981 | Dahl .............................. 8/125 |
| 4,520,520 A | | 6/1985 | Johnston et al. |
| 4,681,935 A | | 7/1987 | Forss et al. |
| 4,806,203 A | | 2/1989 | Elton |
| 4,908,098 A | | 3/1990 | DeLong et al. |
| 5,112,964 A | * | 5/1992 | Aoe et al. ....................... 536/56 |
| 5,367,894 A | | 11/1994 | Parks et al. |
| 5,466,335 A | | 11/1995 | Parks |
| 5,785,810 A | | 7/1998 | Salminen |
| 5,849,197 A | * | 12/1998 | Taylor et al. ................ 210/652 |
| 5,858,021 A | | 1/1999 | Sun et al. |
| 5,961,803 A | * | 10/1999 | Landfors et al. ............. 204/529 |
| 5,968,317 A | * | 10/1999 | Gartz et al. .................. 162/190 |
| 5,997,744 A | * | 12/1999 | Limaye ....................... 210/650 |
| 6,017,415 A | | 1/2000 | Phillips et al. |
| 6,147,206 A | | 11/2000 | Doner et al. |
| 6,322,768 B1 | | 11/2001 | Graff et al. |
| 6,346,167 B2 | * | 2/2002 | Marcoccia et al. ........... 162/42 |
| 2002/0014317 A1 | | 2/2002 | Nay et al. |

FOREIGN PATENT DOCUMENTS

| | | |
|---|---|---|
| GB | 625 961 A | 7/1949 |
| GB | 764 836 A | 1/1957 |
| WO | WO 85/04409 | 10/1985 |
| WO | WO 85044409 | * 10/1985 |
| WO | WO 95/27681 | * 10/1995 |
| WO | WO 97/23279 | * 7/1997 |

OTHER PUBLICATIONS

Derwent–Acc –No 1997–350816, Krebs & Cie, Jul. 3, 1997.*
JP Abstract 2001055679 A, Feb. 27, 2001.*
H. B. Vollrath; *Applying Dialysis to Colloid–Crystalloid Separations; Chemical and Metallurgical Engineering;* Jun. 1936; pp. 303–306; XP008024424.
Database WPI, Section Ch; Week 197649; Dewent Publications Ltd., London, GP; Class A11, AN 1976–91658X; XP002260709 & JP 51 121486 A (Kuraray Co. Ltd.), Oct. 23, 1976 abstract.

* cited by examiner

Primary Examiner—Ana Fortuna
(74) Attorney, Agent, or Firm—Alston & Bird LLP

(57) ABSTRACT

Systems and methods by which to subject cellulosic fibers to alkaline treatment are provided. The systems and methods of the invention include equipment, such as nanofiltration units and slurry concentrators, which result in a lowered overall consumption of alkaline solution during alkaline treatment. The systems and methods of the invention further allow the components of hemicaustic streams produced by such alkaline treatments to be utilized in higher value end uses.

33 Claims, 4 Drawing Sheets

PROCESS FOR PRODUCING ALKALINE TREATED CELLULOSIC FIBERS

FIELD OF THE INVENTION

This invention relates to the treatment of cellulosic fibers. More particularly, the invention relates to the alkaline treatment of cellulosic fibers. Specifically, the invention is directed to systems and methods by which to reduce the amount of alkaline solution required by alkaline treatment processes.

BACKGROUND OF THE INVENTION

Numerous chemical treatments for cellulosic fibers are known. For example, it is well known that cellulosic fibers may be treated with various alkaline solutions to impart a number of beneficial properties.

Cellulosic fibers may be treated with concentrated caustic solutions to alter the morphology of the fiber structure, in a process referred to as "mercerization." Mercerization is primarily used to reduce the crystallinity of the cellulose fiber and transforms the ribbon-like cross section of the raw cellulosic fibers into a round shape, providing increased stiffness in the treated fiber. Mercerization processes would also be expected to extract hemicellulose from the fiber. Hemicellulose is generally defined as low molecular weight polysaccharide units inherently present in all cellulosic fibers.

The hemicellulose content of cellulosic fibers may also be reduced by treating the fibers with less concentrated caustic solutions, in an alkaline treatment process commonly referred to as "cold caustic treatment." Cold caustic treated fibers, particularly cold caustic treated wood pulp fibers, may be used in a variety of applications, including as a raw material in the production of regenerated fibers. Hemicellulose is particularly problematic in the production of regenerated fibers, such as rayon or cellulose acetate, because the hemicellulose clogs spinneret holes during fiber formation.

Cold caustic treatments and mercerization are generally performed by mixing a low consistency cellulose slurry with an alkaline solution, typically a sodium hydroxide solution, and allowing the mixture to steep, or react, for a suitable amount of time. The steeped cellulose fiber is subsequently washed to remove the caustic solution and then may be subjected to downstream processing. The effluent stream produced during washing, aptly referred to as a "hemicaustic" stream, generally contains a mixture of extracted hemicellulose, alkali metal hydroxide and water.

The disposal of hemicaustic streams produced during the alkaline treatment of cellulosic fibers has heretofore been problematic. For example, hemicaustic effluent streams produced by pulping operations have historically been incorporated into alkali streams intended for unrelated processes capable of tolerating the presence of the hemicellulose. However, the number of processes capable of utilizing hemicaustic streams is limited, as the hemicaustic tends to deposit onto pulp fibers when the effluent is used in the conventional cooking, bleaching or caustic extraction processes involved in pulp production. Such deposits render the pulp unfit for many important end uses. Further, extraneous process equipment, e.g. pumps, piping and the like, is required to transport the effluent hemicaustic streams to such unrelated processes. Moreover, a cold caustic process generates more hemicaustic than can be used in the rest of the pulping/bleaching process.

The hemicaustic effluent streams and alkali metal hydroxide solutions associated with alkaline treatment processes also typically require specialized handling procedures to ensure that such materials are not discharged to the environment. Generally, significant hemicaustic effluent streams are produced due to the massive scale involved in cellulose based manufacturing operations, such as pulp mills and the like, further exacerbating the problem. In addition to environmental concerns, the economic value of the hemicellulose contained within the hemicaustic stream, heretofore considered an unwanted by-product, is not recovered within conventional alkaline treatment processes. Thus there remains a need in the art for cellulosic fiber alkaline treatment processes having improved economic and environmental attributes.

BRIEF SUMMARY OF THE INVENTION

The present invention provides systems and methods that address the disposal issues associated with hemicaustic effluent streams, such as those produced by conventional alkaline treatment systems. More particularly, the present invention provides systems and processes by which a portion of the alkaline solution may be recovered from hemicaustic effluent streams and recycled back into the alkaline treatment system. The present invention further provides systems and processes by which the hemicellulose contained in such hemicaustic streams is recovered, which may then be used as feedstock in higher value end uses.

The present invention generally relates to alkaline treatment systems which include a cellulose slurry supply system for providing cellulosic fiber containing hemicellulose to an alkaline treatment system; a steeping liquor supply system for providing an effective amount of a steeping liquor comprising an alkaline solution to the alkaline treatment system; a mixing system for combining the cellulosic fiber and the steeping liquor into an alkaline cellulose slurry; at least one alkaline treatment unit for steeping the alkaline cellulose slurry for a sufficient amount of time to diffuse an effective amount of the hemicellulose out of the cellulosic fibers and into the steeping liquor; at least one treated cellulose washer to separate the spent steeping liquor containing the diffused hemicellulose from the treated cellulosic fibers; and a nanofiltration system comprising at least one nanofiltration unit to remove at least a portion of the hemicellulose from the spent steeping liquor. In advantageous embodiments, the nanofiltration system of the present invention may include a plurality of nanofiltration units.

The nanofiltration units of the present invention beneficially include at least one nanofiltration membrane capable of excluding compounds having a molecular weight of about 200 and higher. In further advantageous embodiments, the nanofiltration unit may include at least one nanofiltration membrane having a nominal molecular weight cut-off of 200 daltons. Nanofiltration units in accordance with the present invention may further include at least one polymeric nanofiltration membrane. Such polymeric nanofiltration membrane may be advantageously formed from a polymer selected from polyether sulfone, polysulfone, polyarylether sulfones, polyvinylidene fluoride, polyvinyl chloride, polyketones, polyether ketones, polytetrafluoro ethylene, polypropylene, polyamides or mixtures thereof.

In beneficial embodiments, the nanofiltration system of the present invention may further include one or more pre-filtration units having a screen size ranging from about 1 to 100 microns positioned prior to the nanofiltration unit. Exemplary pre-filtration units include bag filters, ribbon filters, self-cleaning filters and the like.

Exemplary treated cellulose washers for use in the present invention include horizontal belt washers, rotary drum washers, vacuum filters, wash presses, CBF filters, atmospheric diffusers and pressure diffusers. In advantageous embodiments, the treated cellulose washer is a horizontal belt washer.

According to one aspect of the invention, the cellulose slurry supply system may further include at least one slurry concentrator to increase the consistency of the cellulose slurry, such as either a twin roll press, or a screw press. In beneficial embodiments of the invention, the consistency of the cellulose slurry supplied to the alkaline treatment unit may range from about 10 to 50%.

Cellulosic fibers suitable for use in the present invention may be derived from a number of sources, including wood, cotton, straws, grasses, canes, reeds, bamboos, stalks with bast fibers, leaf fibers and mixtures thereof. In beneficial aspects of the invention, the cellulosic fibers are derived from wood pulp. Exemplary wood pulp sources include softwood pulp, hardwood pulp and mixtures thereof. In advantageous aspects of the invention, the cellulosic fibers may have a hemicellulose content up to 30%.

Steeping liquors formed in accordance with the invention may include at least one caustic compound in an amount ranging from about 3 to 50%. In advantageous aspects, the steeping liquor may consist essentially of recycled alkaline solution. Towards that end, in advantageous aspects the nanofiltration system may further include at least one evaporator to provide more concentrated recycled alkaline solution for use in the steeping liquor. The steeping liquor supply system may further include at least one chiller.

In advantageous embodiments, the mixing system of the present invention may include one or more mixers selected from a screw conveyor, a rotor/stator mixer and a hydraulic piston mixer. For example, a mixing system in accordance with the present invention may include a screw conveyor in series with either a rotor/stator or hydraulic piston mixer.

In beneficial aspects of the invention, the alkaline treatment unit for steeping the alkaline cellulose slurry is an extraction tower within a wood pulp bleaching operation. In further advantageous aspects, the alkaline treatment system of the present invention is positioned between oxidation vessels within a wood pulp bleaching operation. In beneficial embodiments of such aspects, the alkaline treatment system may be positioned prior to the final bleaching vessel within a wood pulp bleaching operation.

The present invention also provides beneficial methods by which to alkaline treat cellulosic fibers. The present alkaline treatment methods generally include: providing cellulosic fibers containing hemicellulose to an alkaline treatment system; providing a steeping liquor comprising an alkaline solution to the alkaline treatment system; combining the cellulosic fibers and the steeping liquor into an alkaline cellulose slurry within a mixing system; steeping the alkaline cellulose slurry for a sufficient amount of time to diffuse an effective amount of the hemicellulose out of the cellulosic fibers and into the steeping liquor; using a washer to wash the treated cellulose slurry to remove the spent steeping liquor containing the diffused hemicellulose from the treated cellulosic fibers, thereby creating a hemicaustic stream; passing a portion or all of the hemicaustic stream containing the spent steeping liquor exiting the treated cellulose washer through a nanofiltration system which includes at least one nanofiltration unit to remove at least a portion of the hemicellulose from the hemicaustic stream containing the spent steeping liquor. In advantageous aspects, the step of steeping the alkaline cellulose slurry for a sufficient amount of time comprises steeping the alkaline cellulose slurry for a holding time up to about 4 hours. The step of steeping the alkaline cellulose slurry to diffuse an effective amount of the hemicellulose out of the cellulosic fibers may further beneficially involve diffusing up to 100% of the hemicellulose originally in the entering fibers. At least a portion of the hemicellulose diffused from the cellulosic fibers may then advantageously be removed from the hemicaustic stream containing the spent steeping liquor by passing the hemicaustic stream through a nanofiltration system comprising at least one nanofiltration unit. In beneficial embodiments, the nanofiltration system may remove up to 100% of the hemicellulose present within the hemicaustic stream.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

For purposes of clarity and illustration only, the systems and methods of the present invention may generally be described in relation to cold caustic treatments, particularly the cold caustic treatment of cellulosic fibers. However, it should be understood that the systems and methods of the present invention may also be used in conjunction with alkaline treatments other than cold caustic treatments, such as mercerization and the like.

Further, although the present invention may generally be described in relation to cellulosic fibers derived from wood pulp, the systems and methods of the present invention may be used in conjunction with any cellulosic fiber derived from any source. Exemplary cellulosic fibers include, but are not limited to, those derived from wood, such as wood pulp, as well as non-woody fibers from cotton, from straws and grasses, such as rice and esparto, from canes and reeds, such as bagasse, from bamboos, from stalks with bast fibers, such as jute, flax, kenaf, cannabis, linen and ramie, and from leaf fibers, such as abaca and sisal. It is also possible to use mixtures of one or more cellulosic fibers.

Cellulosic pulp fibers suitable for use in the present invention may be derived from either a softwood pulp source or hardwood pulp source or mixtures thereof. Exemplary softwood pulp sources include trees such as various pines (Slash pine, Loblolly pine, White pine, Caribbean pine), Western hemlock, various spruces, (e.g., Sitka Spruce), Douglas fir and/or mixtures of same. Exemplary hardwood pulp sources include trees such as sweet gum, black gum, maple, oak, eucalyptus, poplar, beech, and aspen or mixtures thereof.

As used herein, the term "fiber" or "fibrous" is meant to refer to a particulate material wherein the length to diameter ratio of such particulate material is greater than about 10. In advantageous embodiments, the cellulosic fibers are characterized by an average length, e.g., a WAFL length, between about 0.1 to 6 mm. In advantageous aspects of the invention the average fiber length is between about 0.8 and 4 mm. However, although generally described in relation to fibers, the systems and methods of the invention may further be beneficially employed to produce alkaline treated non-fibrous cellulosic products, as well.

Figure 1:
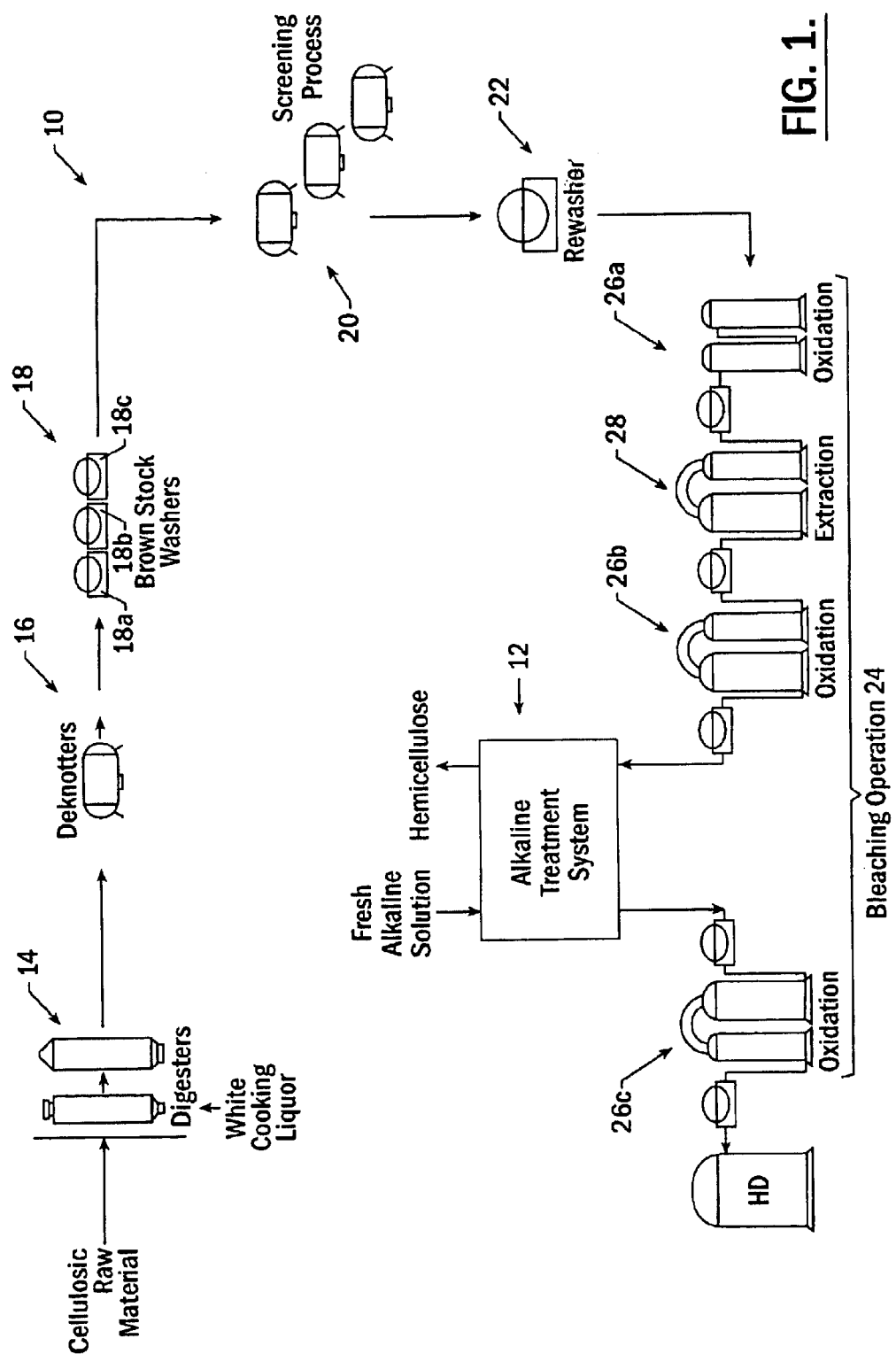
FIG. 1 is a schematic drawing of a wood pulping operation in accordance with one embodiment of the present invention.

Referring now to FIG. 1, an exemplary process for producing cellulosic fibers via a wood pulping operation 10 employing an alkaline treatment system 12 is provided. Wood pulping operations generally entail a series of steps, such as digestion, deknotting and the like, that separate the pulp into individual fibers and remove impurities from the pulp. The wood pulping operation 10 illustrated in FIG. 1 is referred to in the art as a kraft pulping process; however, the systems and methods of the invention are suitable for use in chemical pulping operations such as, but not limited to, sulfite pulping operations, and organic solvent pulping operations, as well.

Unless specified to the contrary, flow rates and processing conditions, i.e., pressures, temperatures, dwell times, and raw materials employed in the various steps within the wood pulping operation 10 are those conventional in the art of wood pulping.

As shown in FIG. 1, the wood pulping operation 10 begins by introducing cellulosic raw material, i.e. wood chips, into one or more digesters 14, along with a sufficient quantity of white cooking liquor. As known in the art, the wood chips may be fed to the digester 14 as is, exposed to pre-steaming before entering the digester 14 or steam packed in the digester 14. The digester 14 may be operated in a continuous or batch mode. In beneficial embodiments, a continuous digester 14 is employed. Broadly defined, continuous digesters generally comprise a vertical processing member with a top chip inlet section, one or more sections for digesting the chips with alkali and a washing section in the bottom portion thereof.

Inside the digester 14, the wood chips are initially cooked for a period of time under sufficient heat and pressure to separate the fibers used to produce kraft pulp using conventional chemical pulping charges, temperatures and cooking times known in the art of kraft pulping. Following cooking, the wood chips are rinsed within the digester 14 and then introduced as a cellulosic slurry into one or more deknotters 16. Knots removed by the deknotter may be discharged from the system and/or they may be returned to the digester 14 for further treatment. Any deknotters 16 known in the art may be used in conjunction with the present invention.

The wood pulp stream exiting the deknotter 16 is transported to one or more brown stock washers 18. The brown stock washers 18 remove the spent chemicals and impurities out of the pulp. In a conventional kraft system there are usually a series of such brown stock washers 18 in which the pulp is washed in progressively cleaner water, with the wash water moving countercurrently against the progression of the pulp from washer to washer so that the cleanest pulp is washed with the cleanest water in the last washer 18c and the dirtiest pulp is washed with the dirtiest water in the first washer 18a.

As shown in FIG. 1, the wood pulp exiting the brown stock washers 18, also commonly referred to as the brown stock, is transported to a screening process 20 and rewasher 22 to further remove debris from the brown stock.

After exiting the rewasher 22, the wood pulp stream typically enters a bleaching operation 24. Any bleaching process known in the art may be suitable for use in the present invention. The bleaching operation 22 provided in FIG. 1 generally includes a series of oxidation and extraction steps (performed in oxidation vessels 26a–c and extraction tower 28, respectively) intended to remove lignin from the wood pulp exiting the rewasher 22. The oxidation and extraction steps may be performed using any equipment, processes and materials known in the art of wood pulp bleaching. In one advantageous embodiment, chlorine dioxide is used as the oxidizing chemical in the oxidation step. The chlorine dioxide is generally employed in the amounts and conditions known in the art of wood pulp oxidation. In a further advantageous embodiment, a weak alkaline solution may beneficially be employed to extract, i.e. solubilize, the oxidized lignin out of the wood pulp during the extraction step. The weak alkaline solution is generally employed in the amounts and conditions known in the art of wood pulp extraction.

As shown in FIG. 1, an alkaline treatment system 12, such as a cold caustic treatment system, may be incorporated into the bleaching operation 24. Applicants note that although the advantageous embodiment of FIG. 1 illustrates the incorporation of an alkaline treatment system 12 of the present invention within the bleaching operation 24, the alkaline treatment system may beneficially be inserted into a wood pulping operation 10 at any point after the initial digesters 14.

Figure 2:
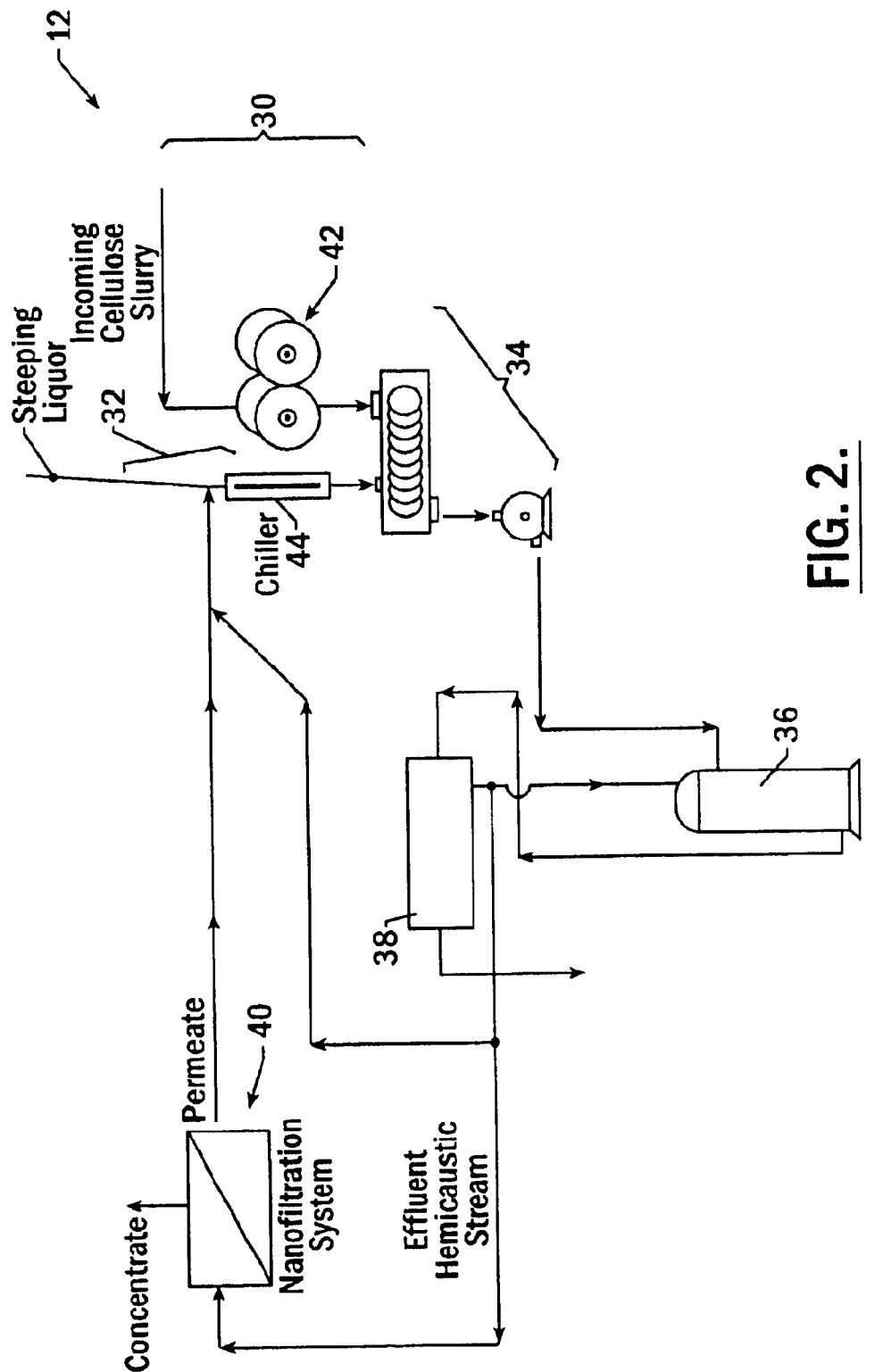
FIG. 2 is a schematic drawing of an alkaline treatment system in accordance with one embodiment of the present invention.

As illustrated in FIG. 2, the alkaline treatment system 12 of the present invention generally includes a cellulose slurry supply system 30; a steeping liquor supply system 32; a mixing system 34 to combine the cellulose slurry and steeping liquor; at least one alkaline treatment unit 36; at least one treated cellulose washer 38 to remove the hemicaustic from the treated cellulose slurry; and a nanofiltration system 40 to treat the effluent hemicaustic stream. The alkaline treatment system 12 of the present invention typically treats wood pulp streams in the form of cellulosic slurries at flow rates and concentrations typical of those known in the art.

As noted above, the cellulosic fibers are generally supplied to the alkaline treatment system 12 in the form of a cellulose wood pulp slurry, which is then combined with an alkaline, or caustic, solution commonly referred to as the steeping liquor. Conventional wisdom has generally taught that in order to ensure proper mixing of the cellulosic fibers and the alkaline solution during alkaline treatments, the incoming cellulose slurry should have a fairly low consistency. Consequently, cellulose slurries subjected to alkaline treatments 12 have heretofore generally been characterized by a relatively low consistency, such as a consistency of about 3 wt %. However, such dilute cellulosic fiber slurries result in the use of more alkaline solution than ideally required, thus increasing production costs.

Applicants have determined that cellulosic fiber slurries having an intermediate consistency may beneficially be subjected to alkaline treatment. More particularly, Applicants have determined that the use of intermediate cellulose slurry consistencies during alkaline treatment provides an acceptable balance between lower consumption of alkaline solution and proper mixing of steeping liquor and cellulosic fiber.

Exemplary cellulose slurry consistencies suitable for use during the alkaline treatment of the present invention include consistencies ranging from about 10 to 50 wt %. In one advantageous embodiment, a consistency of about 20 wt % is employed. As used herein, the term "consistency" refers to the concentration of the cellulosic fibers present in the cellulose slurry. Consequently, the consistency will be presented as a weight percent representing the weight amount of the cellulosic fibers present in the cellulose slurry divided by the total weight amount of cellulosic slurry, multiplied by 100.

The incoming cellulose slurry entering the alkaline treatment system 12 from the wood pulping operation 10 typically has a fairly low consistency, such as a consistency up to 15 wt %, to ease bulk transport properties and the like. A significant quantity of steeping liquor is added to the already dilute cellulose slurry during the alkaline treatment process, further decreasing the consistency. Consequently, to ensure a suitable consistency following the addition of the steeping liquor, the cellulose slurry supply system 30 may advantageously include a slurry concentrator 42 to increase the consistency of the incoming cellulose slurry. The slurry concentrator 42 beneficially includes at least one press. Exemplary presses for use as the slurry concentrator include twin roll presses and screw presses. In advantageous embodiments, at least one twin roll press is utilized as the slurry concentrator. Any twin roll press capable of processing cellulose slurries in accordance with the present invention may be employed. One exemplary twin roll press is commercially available from Metso.

The slurry concentrator 42 may increase the consistency of the incoming cellulose slurry up to 50%. For example, the slurry concentrator may provide a comparatively high consistency cellulose slurry to the mixer 34 which ranges in consistency from about 10 to 50 wt %, such as a comparatively high consistency cellulose slurry having a consistency of about 20 wt %.

The steeping liquor supply system 32 provides a steeping liquor containing an alkaline solution to the mixer. The alkaline solution generally includes a caustic compound, i.e. a compound capable of providing a pH of above 7, dispersed in water. The caustic compound is typically formed from at least one alkali metal salt. Suitable alkali metal salts include, but are not limited to, sodium hydroxide, potassium hydroxide and mixtures thereof. In an alternative embodiment, ammonium hydroxide may be employed as the caustic compound. The concentration of caustic in the steeping liquor introduced into the mixing system 34 typically ranges from about 3 to about 50 wt %. In one beneficial embodiment, the concentration of the caustic compound in the steeping liquor introduced into the mixing system 34 is about 25 wt %. The steeping liquor introduced into the mixer typically exhibits a pH above 12, as known in the art. Sufficient steeping liquor is supplied to the mixing system 34 to produce an alkaline cellulose slurry within the mixing system 34 containing 2 to 20 wt % caustic compound, such as an alkaline cellulose slurry within the mixing system 34 containing about 12 weight percent caustic compound. The alkaline cellulose slurry within the mixing system 34 typically exhibits a pH near 14.

In the advantageous embodiment illustrated in FIG. 2, the steeping liquor supply system 32 further comprises at least one chiller 44. The incoming steeping liquor is typically supplied to the alkaline treatment system 12 at temperatures ranging from about 20 to 90° C. However, the temperature of the steeping liquor supplied to the mixing system 34 advantageously ranges from about 15 to about 40° C.

In the advantageous embodiment provided in FIG. 1, the high consistency cellulose slurry exiting the slurry concentrator 42 is blended with the steeping liquor in a mixing system 34 to form an alkaline cellulose slurry. The mixing system 34 generally includes at least one in-line mixer. The in-line mixer may be any mixer known in the art capable of mixing alkaline cellulose slurries at consistencies of the present invention. Exemplary in-line mixers include, but are not limited to screw conveyors, rotor/stator mixers and hydraulic piston mixers. The mixing system typically includes two mixers, beneficially arranged in series. In the advantageous embodiment illustrated in FIG. 2, the mixing system 34 includes a screw conveyor 46 to initiate the mixing process between the high consistency cellulose slurry exiting the slurry concentrator 42 and the steeping liquor which is in fluid communication with a medium consistency mixer 48, such as a rotor/stator or hydraulic piston mixer. The medium consistency mixer 48 continues the blending process begun in the screw conveyor 46, ensuring adequate intermixing of the cellulose slurry and steeping liquor.

The alkaline cellulose slurry exiting the mixing system 34 is transported to at least one alkaline treatment unit 36 for steeping the alkaline cellulose slurry provided by the mixing system 34 for a sufficient amount of time to diffuse an effective amount of the hemicellulose out of the cellulosic fibers and into the steeping liquor. The alkaline treatment unit 36 is generally a large jacketed vessel providing suitable agitation and dwell time to allow the alkaline cellulosic slurry to effectively steep. Any suitable reactor or vessel may be employed as the alkaline treatment unit 36.

In one beneficial embodiment, the alkaline treatment unit 36 is a reactor, such as an extraction tower, such as typically employed within wood pulp bleaching processes. In further beneficial aspects of this embodiment, the final extraction tower within a multi-step wood pulp bleaching operation is employed as the treatment unit. More specifically, in a wood pulp bleaching operation utilizing three oxidation vessels separated from each other by two extraction towers, the second extraction tower, immediately preceding the final oxidation vessel, may be utilized as a treatment unit in accordance with the present invention. FIG. 1 illustrates such a configuration, in which an alkaline treatment system 12 in accordance with the present invention immediately precedes the final oxidation vessel 26c within a wood pulp bleaching operation 24. In the advantageous embodiment illustrated in FIG. 1, the cellulosic slurry provided to the alkaline treatment system 12 would thus typically be expected to have a fairly low lignin content, as indicated by a brightness above 45%. The fibers within the cellulosic slurry provided to the alkaline treatment system 12 contains up to 30 wt % hemicellulose.

The alkaline treatment is typically conducted at comparatively low temperatures, as known in the art. For example, cold caustic treatments are generally carried out at a temperature less than about 50° C., advantageously at a temperature less than 40° C., such as a temperature between about 20° C. and about 40° C. In one beneficial embodiment, the cold caustic treatment may be conducted at a temperature of about 30° C.

The alkaline cellulose slurry is allowed to steep or react within the alkaline treatment unit 36 for a sufficient amount of time to diffuse an effective amount of the hemicellulose out of the cellulosic fibers and into the steeping liquor. The alkaline cellulose slurry may steep or react within the alkaline treatment unit for exemplary dwell times up to 4 hours. In beneficial embodiments, the alkaline cellulose slurry is allowed to steep or react for a time sufficient to remove up to 100% of the hemicellulose initially present within the cellulose fibers. Consequently, the treated cellulose fibers within the treated cellulosic slurry exiting the alkaline treatment unit 36 generally contains no more than 10% hemicellulose, while the steeping liquor exiting the alkaline treatment unit 36 generally contains from about 0.5 to 7 wt % hemicellulose.

The alkaline cellulose slurry within the alkaline treatment unit 36 generally comprises cellulose fiber, caustic compound and water. The alkaline cellulose slurry within the treatment unit typically has a consistency up to 20%. In one advantageous embodiment, the alkaline treatment unit 36 processes alkaline cellulose slurry having a consistency of about 12%. The alkaline cellulose slurry within the alkaline treatment unit 36 typically contains up to 20 wt % caustic, such as an alkaline cellulose slurry within the alkaline treatment unit 36 containing about 16 weight percent caustic. The pH of the alkaline cellulose slurry within the alkaline treatment unit 36 is typically near 14.

The treated cellulose slurry is transported from the alkaline treatment unit 36 to at least one washer 38, to separate the spent steeping liquor containing the diffused hemicellulose from the treated cellulosic fibers. The washer 38 may be any suitable wet process by which to extract the spent steeping liquor and hemicellulose from the treated cellulose slurry. Exemplary washers 38 for use in the present invention include, but are not limited to, horizontal belt washers, rotary drum washers, vacuum filters, wash presses, compaction baffle (CB) filters, atmospheric diffusers and pressure diffusers. In one advantageous embodiment, the washer 38 is a horizontal belt washer. Horizontal belt washers generally employ a series of showers emitting either fresh or recycled wash water onto the treated cellulose slurry as it travels through the machine on a continuous screen or mesh belt, as known in the art. Similar to the brown stock washers described earlier, horizontal belt washers subject the treated cellulosic slurry to progressively cleaner water, with the wash water moving counter currently against the progression of the pulp from shower to shower so that the cleanest pulp is washed with the cleanest water in the last shower and the dirtiest pulp is washed with the dirtiest water in the first shower. Horizontal belt washers are commercially available as CHEMIWASHER™ from Kadant Black Clawson.

The wash water entering the washer 38 is advantageously purified water, such as water that has been transported through a zeolite bed or the like. The wash water may further contain conventional additives known in the art of pulp washing, such as surface tension modifiers and the like. A sufficient amount of wash water is applied to the treated cellulose slurry traveling through the washer 38 to remove up to 100% of the dissolved hemicellulose and up to 100% of the steeping liquor containing the caustic compound from the incoming treated cellulose slurry.

The spent wash water stream exiting the treated cellulose washer 38, commonly referred to as the hemicaustic stream, generally includes hemicellulose, unreacted caustic compound from the steeping liquor, and water. The hemicaustic stream exiting the washer 38 typically includes from about 0.5 to 7 wt % of hemicellulose. The hemicaustic stream exiting the washer 38 further generally includes up to 20 wt % of caustic compound, with the remainder being water and any optional additives that may have been included in either the steeping liquor or wash water. The hemicaustic stream typically exhibits a pH near 14.

The treated cellulose slurry supplied to the washer 38 advantageously exhibits a comparatively low consistency, such as a consistency ranging from about 2 to 4 wt %. However, the treated cellulose slurry exiting the alkaline treatment unit 36 typically exhibits a consistency ranging from about 2 to 12 wt %, i.e. the consistency of the treated cellulosic slurry is comparable to the consistency of the alkaline cellulose slurry exiting the mixing system 34. Therefore, to provide treated cellulose slurry having a suitable consistency to the washer 38, a portion of the hemicaustic stream exiting the washer 38 may be diverted and used to lower the consistency of the treated cellulose slurry stream entering the washer. For example, up to 80% of the hemicaustic stream exiting the washer 38 may be diverted and mixed with the treated cellulose slurry exiting the alkaline treatment unit.

A portion of the remaining, i.e. undiverted, hemicaustic stream is transported from the treated cellulose washer 38 to a nanofiltration system 40 to remove a portion of the hemicellulose from the hemicaustic stream. As used herein, the term "nanofiltration system" refers to a process that uses a filtration membranes having a smaller pore size than those typically used in ultrafiltration processes. Conventional wisdom teaches that smaller pore sizes foul more quickly when filtering highly contaminated streams containing larger contaminants. Hemicaustic streams typically contain high loadings of such large contaminants, such as cellulosic fines and fibers. For example, hemicaustic streams commonly contain up to 0.05 wt % of fines and fibers having diameters of up to 100 microns. Thus it is altogether surprising that nanofiltration membranes, having significantly smaller pores than ultrafiltration membranes, can be successfully employed in conjunction with the hemicaustic streams of the present invention.

Figure 3:
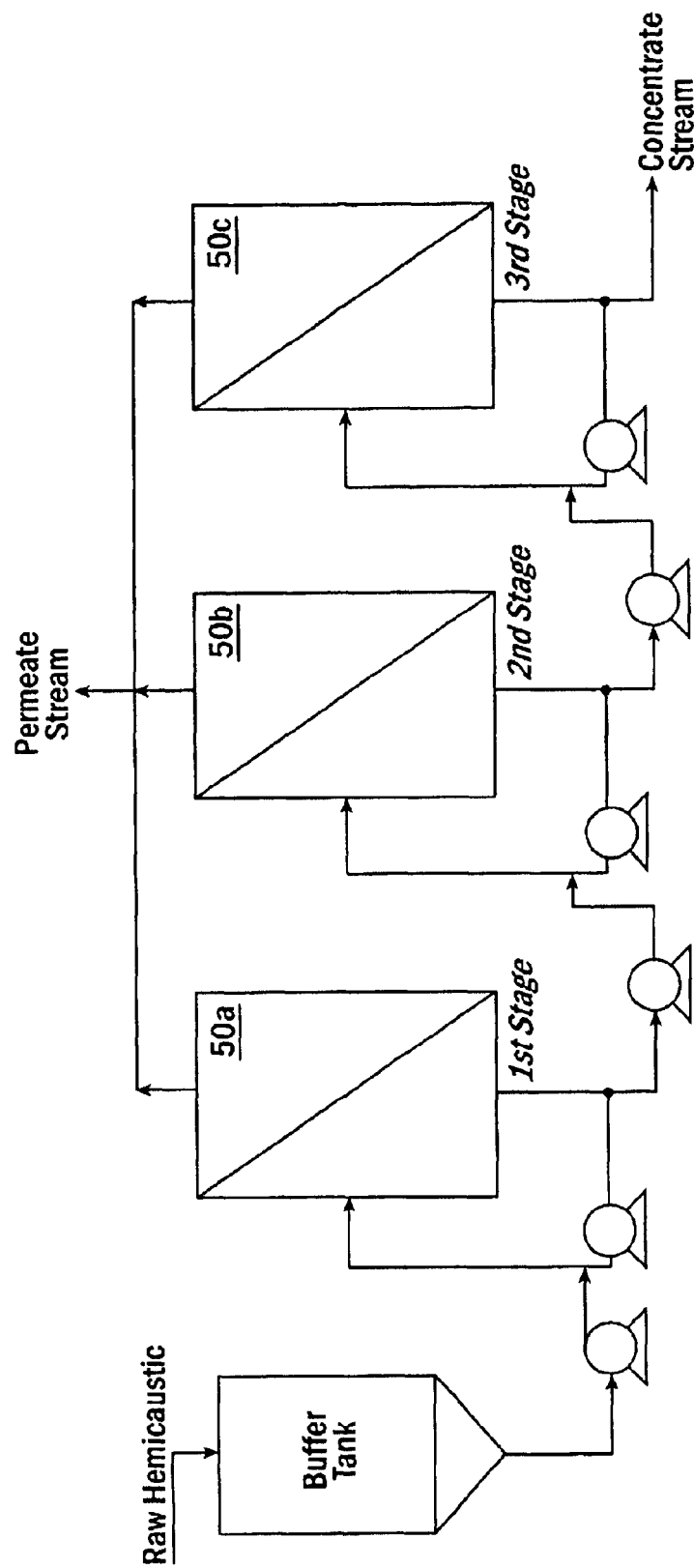
FIG. 3 is a schematic drawing of a nanofiltration system in accordance with one embodiment of the present invention.

FIG. 3 illustrates a nanofiltration system 40 in accordance with advantageous aspects of the invention. The nanofiltration system 40 generally includes at least one nanofiltration unit and beneficially includes a plurality of nanofiltration units. In the beneficial embodiment illustrated in FIG. 3, the nanofiltration system 40 includes three nanofiltration units, 50a–50c. Each nanofiltration unit 50a–50c may advantageously include one or more nanofiltration membranes. Nanofiltration membranes for use in the systems of the present invention are generally formed from polymers and, in one advantageous embodiment, have a nominal molecular weight cut off of about 200 daltons.

By use of nanofiltration membranes having the appropriate nominal molecular weight cut off or pore size, the desired components in the hemicaustic stream, i.e. those having a molecular size smaller than the molecular weight cut off or nominal pore diameter of the nanofiltration membrane, pass through the nanofiltration membrane and exit the nanofiltration system 40 as permeate. The undesired components within the hemicaustic stream, e.g., hemicellulose, having a molecular size larger than the nominal molecular weight cut off of the membrane, are rejected by the nanofiltration membrane and exit the nanofiltration system 40 as a concentrate stream.

The nanofiltration membranes may be formed from a number of different polymers, as known in the art. More particularly, any polymer capable of withstanding the elevated pH's associated with the hemicaustic stream may be employed. Advantageously, the polymer used to form the nanofiltration membrane is capable of withstanding pHs above 14 for an extended period of time. Exemplary materials for use in forming ultrafiltration membranes include many commercially available polymers such as polyether sulfone, polysulfone, polyarylether sulfones, polyvinylidene fluoride, polyvinyl chloride, polyketones, polyether ketones, polytetrafluoro ethylene, polypropylene and polyamides and mixtures thereof. The degradation properties of the foregoing polymers may further be improved by altering their molecular weight distribution, as described in U.S. Pat. No. 5,279,739.

The nanofiltration system 40 may be operated at any temperature known in the art, such as at temperatures of up to about 70° C. In one advantageous embodiment, the nanofiltration system is operated at a temperature of about 50° C. The pressure at which nanofiltration is carried out is advantageously high enough to provide adequate flow through the nanofiltration membrane to achieve desired processing efficiencies. Typically, the nanofiltration system 40 may be operated at a hydrostatic pressure of from about 100 to about 500 psi, advantageously from about 300 to about 450 psi.

The nanofiltration membrane can be in a number of different configurations and are usually positioned within a cartridge type assembly or module within a larger nanofiltration unit. Preferred membrane configurations for use in the process of the present invention are commonly referred to as "spiral wound membranes." Spiral wound membranes typically include a centrally positioned permeate or filtrate tube and at least one sheet of a membrane with appropriate spacer and backing that is spirally wound around the permeate or filtrate tube.

Other suitable configurations include nanofiltration units 50 containing tubular arrays of hollow fiber membranes where a plurality of hollow membrane fibers (e.g., 3 to 20) are disposed within a modular housing. Flat sheet filter cartridges containing a series of 2 or more spaced apart nanofiltration membrane plates or sheets can also be used as a nanofiltration unit accordance with the present invention.

As illustrated in FIG. 3, the nanofiltration system 40 can advantageously include a plurality, of nanofiltration units arranged in series. For example, the nanofiltration system 40 may include three nanofiltration units 50a–50c arranged in series. In such advantageous embodiments, the additional nanofiltration units 50b–50c may be arranged so as to filter the concentrate exiting the previous nanofiltration unit 50a or 50b, thereby increasing the overall efficiency of the nanofiltration system relative to a nanofiltration system having a single nanofiltration unit. For example, a 400 gpm hemicaustic stream may be transported through an initial nanofiltration unit, yielding a 180 gpm permeate stream and a 220 gpm concentrate stream. A second nanofiltration unit can then be used to filter the concentrate stream exiting the first nanofiltration unit, thereby producing a 100 gpm permeate stream and 120 gpm concentrate stream. A third nanofiltration unit can then be used to filter the concentrate stream exiting the second nanofiltration unit, thereby producing a 40 gpm permeate stream and an 80 gpm concentrate stream.

Figure 4:
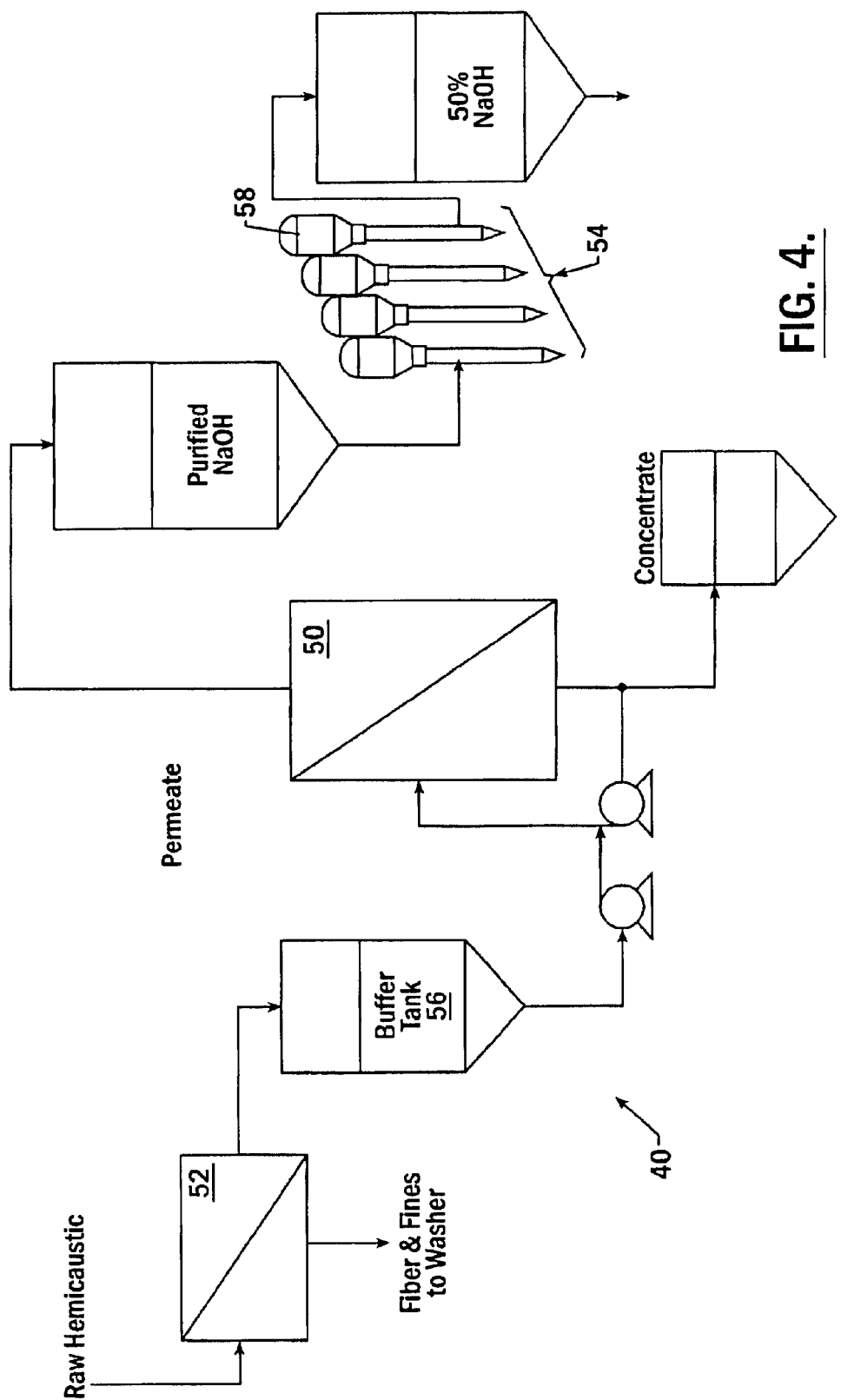
FIG. 4 is a schematic drawing of a nanofiltration system incorporating a plurality of nanofiltration units in accordance with one embodiment of the present invention.

FIG. 4 illustrates a further advantageous embodiment of the invention, in which the nanofiltration system 40 includes both a pre-filtration unit 52 to remove larger contaminants from the hemicaustic stream prior to nanofiltration and an evaporation system 54 to increase the concentration of the permeate stream. The pre-filtration unit 52 is generally designed to remove contaminants having a nominal diameter of 5 microns or greater. Consequently, the pre-filtration unit 52 can include one or more filters having a screen size ranging from about 400 to 650 mesh. Suitable filters for use in the pre-filtration unit 52 include any conventional filter known in the art capable of withstanding alkaline conditions such as associated with the hemicaustic stream. Non-limiting examples of suitable pre-filters include bag filters, ribbon filters and self-cleaning filters. The pre-filtration unit 52 is generally positioned prior to the nanofiltration unit 50. However, as shown in FIG. 4, a buffer tank 56 may be positioned between the pre-filtration unit 52 and the nanofiltration unit 50.

The permeate stream exiting the one or more nanofiltration units 50 is an alkaline solution containing from about 2 to about 20 wt % caustic. The permeate stream exiting the one or more nanofiltration units 50 is advantageously essentially free of hemicellulose. Residual hemicellulose remaining in the permeate stream exiting the one or more nanofiltration units 50 can generally range from about 0 to about 0.5 wt %. The permeate stream exiting the one or more nanofiltration units 50 may further contain more than 80 wt % water. Such dilute alkaline streams may not be suitable in all applications. Consequently, in beneficial embodiments, the nanofiltration system 40 further comprises an evaporation system 54 to increase the concentration of the permeate stream exiting the nanofiltration system. The evaporation system 54 may include one or more evaporators 58, advantageously positioned in series. The beneficial embodiment provided in FIG. 4 illustrates an evaporation system 54 with four evaporators 52 positioned in series. The evaporators increase the concentration of the permeate stream exiting the nanofiltration system 40 from an initial concentration of about 1 to 20 wt % to a final concentration of about 25 to 50 wt %.

The permeate stream exiting the nanofiltration system 40 may advantageously be used as an alkaline solution in any suitable application. For example, the permeate stream exiting the nanofiltration system 40 may be recycled back into the steeping liquor supply system 32, as indicated in FIG. 2. The permeate stream exiting the nanofiltration system 12 may typically constitute up to 100% of the alkaline solution included in the steeping liquor entering the alkaline treatment system 12. In advantageous embodiments, the permeate stream exiting the nanofiltration system 12 constitutes about 80 wt % of the alkaline solution included in the steeping liquor entering the alkaline treatment system 12.

The concentrate stream exiting the nanofiltration system 12 is likewise an alkaline solution containing up to 20 wt % caustic in water. However, the concentrate stream exiting the nanofiltration system 12 further contains from about 5 to about 30 wt % hemicellulose. The hemicellulose within the concentrate stream exiting the nanofiltration system 12 may be utilized in numerous applications, including as a feedstock in the production of xylitol.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An alkaline treatment system comprising:
    a cellulose slurry supply system for providing cellulosic fiber containing hemicellulose to said alkaline treatment system;
    a steeping liquor supply system for providing an effective amount of a steeping liquor comprising an alkaline solution to said alkaline treatment system;
    a mixing system for combining the cellulosic fiber and the steeping liquor into an alkaline cellulose slurry;
    at least one alkaline treatment unit for steeping the alkaline cellulose slurry for a sufficient amount of time to diffuse an effective amount of the hemicellulose out of the cellulosic fibers and into the steeping liquor;
    at least one treated cellulose washer to separate the spent steeping liquor containing the diffused hemicellulose from the treated cellulosic fibers; and
    a nanofiltration system comprising at least one nanofiltration unit to remove at least a portion of the hemicellulose from the spent steeping liquor.

2. An alkaline treatment system according to claim 1, wherein said nanofiltration unit includes at least one nanofiltration membrane capable of excluding compounds having a molecular weight of about 200 and higher.

3. An alkaline treatment system according to claim 1, wherein said nanofiltration system comprises a plurality of nanofiltration units.

4. An alkaline treatment system according to claim 1, wherein said nanofiltration unit includes at least one polymeric nanofiltration membrane.

5. An alkaline treatment system according to claim 4, wherein said polymeric nanofiltration membrane is formed from a polymer selected from the group consisting of polyether sulfone, polysulfone, polyarylether sulfones, polyvinylidene fluoride, polyvinyl chloride, polyketones, polyether ketones, polytetrafluoro ethylene, polypropylene, polyamides and mixtures thereof.

6. In alkaline treatment system according to claim 1, wherein said nanofiltration system further comprises one or more pre-filtration units having a screen size ranging from about 400 to 650 mesh.

7. An alkaline treatment system according to claim 1, wherein said nanofiltration system further comprises one or more pre-filtration units selected from bag filters, ribbon filters and self-cleaning filters.

8. An alkaline treatment system according to claim 1, wherein said nanofiltration system further comprises an evaporation system.

9. An alkaline treatment system according to claim 1, wherein said at least one washer is selected from a group consisting of a horizontal belt washer, rotary drum washer, vacuum filter, wash press, compaction baffle washer, atmospheric diffuser and pressure diffuser.

10. An alkaline treatment system according to claim 1, wherein said cellulose slurry supply system further comprises at least one press to increase the consistency of the cellulose slurry selected from a group consisting of a twin roll press and a screw press.

11. An alkaline treatment system according to claim 1, wherein the consistency of the cellulose slurry supplied to the alkaline treatment unit is up to 50%.

12. An alkaline treatment system according to claim 1, wherein said cellulosic fibers are derived from a source selected from the group consisting of wood, cotton, straws, grasses, canes, reeds, bamboos, stalks with bast fibers, leaf fibers and mixtures thereof.

13. An alkaline treatment system according to claim 1, wherein said cellulosic fibers are derived from wood pulp.

14. An alkaline treatment system according to claim 1, wherein said wood pulp is selected from softwood pulp, hardwood pulp and mixtures thereof.

15. An alkaline treatment system according to claim 1, wherein said cellulosic fibers have a hemicellulose content up to 30%.

16. An alkaline treatment system according to claim 1, wherein said cellulosic fibers exhibit a brightness above 45%.

17. An alkaline treatment system according to claim 1, wherein said steeping liquor comprises at least one caustic compound in an amount up to 50 wt %.

18. An alkaline treatment system according to claim 1, wherein said steeping liquor consists essentially of recycled alkaline solution.

19. An alkaline treatment system according to claim 1, wherein said steeping liquor supply system further comprises at least one chiller.

20. An alkaline treatment system according to claim 1, wherein said mixing system comprises one or more mixers selected from a screw conveyor, a rotor/stator mixer, and a hydraulic piston mixer.

21. An alkaline treatment system according to claim 1, wherein said mixing system comprises a screw conveyor in series with either a rotor/stator or hydraulic piston mixer.

22. An alkaline treatment method comprising:
    providing cellulosic fibers containing hemicellulose to an alkaline treatment system that includes a mixing system, at least one alkaline treatment unit, at least one treated cellulose washer and a nanofiltration system;
    providing a steeping liquor comprising an alkaline solution to the alkaline treatment system;
    combining the cellulosic fibers and the steeping liquor into an alkaline cellulose slurry within the mixing system;
    steeping the alkaline cellulose slurry for a sufficient amount of time to diffuse an effective amount of the hemicellulose out of the cellulosic fibers and into the steeping liquor within the alkaline treatment unit;
    washing the treated cellulose slurry in the treated cellulose washer to remove the spent steeping liquor containing the diffused hemicellulose from the treated cellulosic fibers;
    passing the spent steeping liquor through a nanofiltration system comprising at least one nanofiltration unit to remove at least a portion of the hemicellulose from the spent steeping liquor.

23. An alkaline treatment method according to claim 22, wherein said step of providing cellulosic fibers further comprises providing cellulosic fibers having a brightness ranging above 45% and hemicellulose content up to 30%.

24. An alkaline treatment method according to claim 22, wherein said step of providing cellulosic fibers further comprises providing a cellulose slurry having a consistency up to 20%.

25. An alkaline treatment method according to claim 22, wherein said step of providing a steeping liquor further comprises providing a steeping liquor at a temperature ranging from about 20 to 90° C.

26. An alkaline treatment method according to claim 22, wherein said step of providing a steeping liquor further comprises providing a steeping liquor containing up to 50 wt % caustic.

27. An alkaline treatment method according to claim 22, wherein said step of combining the cellulosic fibers and the steeping liquor further comprises passing the cellulosic fibers and steeping liquor through a screw conveyor in fluid communication with either a rotor/stator or hydraulic piston mixer.

28. An alkaline treatment method according to claim 22, wherein said step of steeping the alkaline cellulose slurry for a sufficient amount of time comprises steeping the alkaline cellulose slurry for a time up to 4 hours.

29. An alkaline treatment method according to claim 22, wherein said step of steeping the alkaline cellulose slurry to diffuse an effective amount of the hemicellulose out of the cellulosic fibers comprises diffusing up to 100% of the hemicellulose out of the cellulosic fibers.

30. An alkaline treatment method according to claim 22, wherein said step of washing the treated cellulose slurry further comprises passing the cellulose slurry through a horizontal belt washer.

31. An alkaline treatment method according to claim 22, wherein said step of passing the spent steeping liquor through a nanofiltration system further comprises passing the spent steeping liquor through a plurality of nanofiltration units.

32. An alkaline treatment method according to claim 22, wherein said step of passing the spent steeping liquor through a nanofiltration system further comprises passing the spent steeping liquor through at least one pre-filtration unit having a mesh size of 400 or greater prior to passing the spent steeping liquor through the nanofiltration unit.

33. An alkaline treatment method according to claim 22, wherein said step of passing the spent steeping liquor through a nanofiltration system comprising at least one nanofiltration unit to remove at least a portion of the hemicellulose from the spent steeping liquor comprises removing up to 100% of the hemicellulose present within the spent steeping liquor.

* * * * *